US008571764B2

(12) United States Patent
Peterson et al.

(10) Patent No.: US 8,571,764 B2
(45) Date of Patent: Oct. 29, 2013

(54) DYNAMIC SPRAY BUFFER CALCULATION

(75) Inventors: John Peterson, Jackson, MN (US); Nyle Curtis Wollenhaupt, Newton, KS (US)

(73) Assignee: AGCO Corporation, Duluth, GA (US)

( * ) Notice: Subject to any disclaimer, the term of this patent is extended or adjusted under 35 U.S.C. 154(b) by 85 days.

(21) Appl. No.: 13/280,503

(22) Filed: Oct. 25, 2011

(65) Prior Publication Data

US 2013/0103211 A1 Apr. 25, 2013

(51) Int. Cl.
*G06F 7/70* (2006.01)
*G06F 19/00* (2011.01)
*G06G 7/00* (2006.01)

(52) U.S. Cl.
USPC .......... 701/50

(58) Field of Classification Search
USPC .......... 701/50
See application file for complete search history.

(56) References Cited

U.S. PATENT DOCUMENTS 4,795,095 A 1/1989 Shepard
4,823,268 A * 4/1989 Giles et al. .......... 701/50
5,260,875 A * 11/1993 Tofte et al. .......... 701/50
5,288,488 A 2/1994 Backman et al.
5,653,389 A 8/1997 Henderson et al.
5,704,546 A 1/1998 Henderson et al.
5,721,679 A * 2/1998 Monson .......... 701/50
6,070,539 A * 6/2000 Flamme et al. .......... 111/177
6,112,143 A * 8/2000 Allen et al. .......... 701/25
6,274,137 B1 8/2001 Mensah
6,390,387 B1 5/2002 Stehling
6,468,523 B1 10/2002 Mettus et al.
6,544,513 B2 4/2003 Mensah
6,698,668 B2 3/2004 Stehling
6,723,897 B2 4/2004 Brown et al.
6,786,425 B2 9/2004 Rawlings
7,022,897 B2 4/2006 Mettus et al.
7,087,849 B2 8/2006 Brown et al.
7,124,964 B2 10/2006 Bui
7,195,917 B2 3/2007 Brown et al.
7,425,595 B2 9/2008 Savich et al.
7,429,454 B2 9/2008 Mettus et al.
7,848,865 B2 * 12/2010 Di Federico et al. .......... 701/50
7,855,326 B2 12/2010 Feng et al.
2001/0024646 A1 9/2001 Mensah
2002/0053095 A1 5/2002 Brown et al.
2002/0071916 A1 6/2002 Rawlings
2002/0158142 A1 10/2002 Stehling
2003/0068335 A1 4/2003 Mettus et al.
2003/0233679 A1 12/2003 Brown et al.
2004/0054010 A1 3/2004 Sutherland et al.
2004/0069875 A1 4/2004 Bui
2006/0123512 A1 6/2006 Mettus et al.
2006/0147438 A1 7/2006 Azevedo et al.
2006/0276337 A1 12/2006 Sixl et al.
2006/0276342 A1 12/2006 Krahmer et al.
2007/0015878 A1 1/2007 Savich et al.
2007/0174931 A1 7/2007 Brown et al.
2007/0225338 A1 9/2007 Mizell, III et al.

(Continued)

*Primary Examiner* — Mary Cheung
*Assistant Examiner* — Frederick Brushaber

(57) ABSTRACT

In one embodiment, a method that comprises retrieving by a processing unit an application plan from memory, the application plan comprising coordinates for a buffer area associated with dispensing a product onto a field; receiving information from a weather station, the information corresponding to substantially current climatic conditions detected by the weather station in the field; responsive to receiving the information from the weather station, adjusting the application plan; and causing an agricultural machine to operate according to the adjusted application plan.

20 Claims, 6 Drawing Sheets

(56) References Cited

U.S. PATENT DOCUMENTS

| | | | |
|---|---|---|---|
| 2008/0119361 A1 | 5/2008 | Feng et al. | |
| 2009/0065603 A1 | 3/2009 | Ward et al. | |
| 2009/0087863 A1 | 4/2009 | Mettus et al. | |
| 2009/0099737 A1* | 4/2009 | Wendte et al. | 701/50 |
| 2009/0105074 A1 | 4/2009 | Azevedo et al. | |
| 2009/0120339 A1 | 5/2009 | Detweiler et al. | |
| 2009/0151243 A1 | 6/2009 | Detweiler et al. | |
| 2009/0181849 A1 | 7/2009 | Detweiler et al. | |
| 2009/0192040 A1 | 7/2009 | Grobler | |
| 2009/0308121 A1 | 12/2009 | Reddy et al. | |
| 2010/0093536 A1 | 4/2010 | Armstrong et al. | |
| 2010/0159042 A1 | 6/2010 | Neumann | |
| 2010/0234230 A1 | 9/2010 | Fowler | |
| 2010/0292079 A1 | 11/2010 | Fowler | |
| 2011/0077155 A1 | 3/2011 | Goodwin | |
| 2011/0077157 A1 | 3/2011 | Sixl et al. | |
| 2011/0152096 A1 | 6/2011 | Feng et al. | |
| 2011/0160961 A1 | 6/2011 | Wollenhaupt et al. | |
| 2013/0110357 A1* | 5/2013 | Peterson et al. | 701/50 |

* cited by examiner

DYNAMIC SPRAY BUFFER CALCULATION

TECHNICAL FIELD

The present disclosure is generally related to agricultural field dispensing systems and, more particularly, dispensing of product.

BACKGROUND

Agricultural field dispensing systems, such as sprayer systems in use today, need to manage drift. Drift is a term often used with crop protection, and generally refers to small droplets of solution containing chemicals mixed with water that do not attach to the target pest. Drift that leaves a target or target zone may have undesirable effects on non-target organisms, as well as air and water quality. The Environmental Protection Agency (EPA) has recently placed more focus on drift, drift control, and the definition of sensitive areas.

Creation of buffer areas or zones in a target area or field is one way to manage drift. For instance, buffer zones may be defined in a chemical label or other documents that prescribe a setback (buffer) from any area determined to be sensitive.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
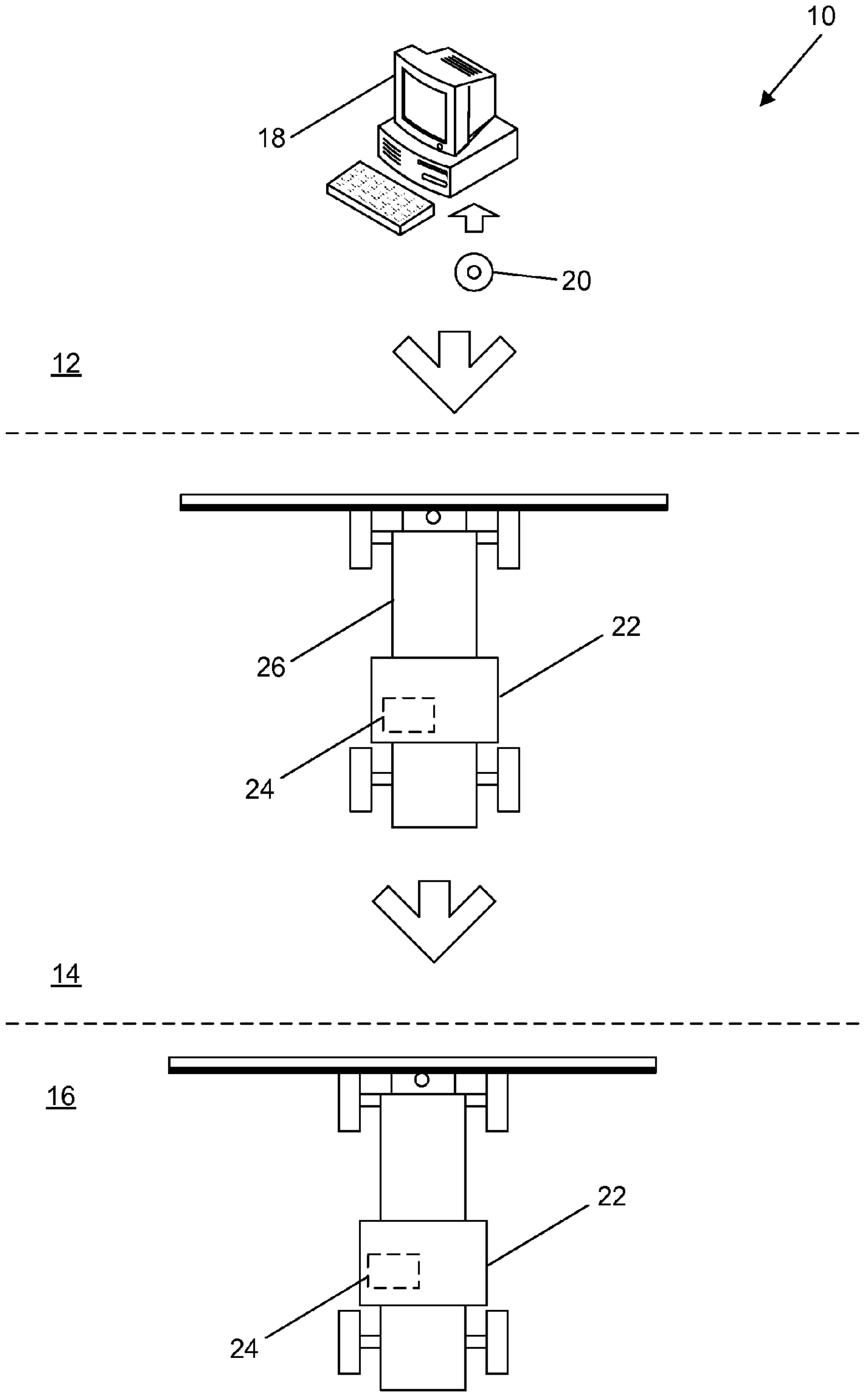
FIG. 1 is a schematic diagram that generally illustrates an application planning process in which certain embodiments of dynamic spray buffer calculation systems and methods may be employed.

In one embodiment, a method that comprises retrieving by a processing unit an application plan from memory, the application plan comprising coordinates for a buffer area associated with dispensing a product onto a field; receiving information from a weather station, the information corresponding to substantially current climatic conditions detected by the weather station in the field; responsive to receiving the information from the weather station, adjusting the application plan; and causing an agricultural machine to operate according to the adjusted application plan.

Detailed Description

Certain embodiments of dynamic spray buffer calculation systems and methods are disclosed that create buffer areas or zones (herein, also referred to merely as buffers) adjacent to target areas of a field as part of an application planning process to manage drift of a dispensed product (e.g., chemicals, such as pesticides, fertilizers, etc.), adjust the buffer areas if climatic changes at the time of implementing the application plan merit a change, and then adjust settings for machine controls of a sprayer machine based on the adjusted buffer areas.

In contrast, conventional sprayer systems treat the buffer areas as static areas, which may result in unintended dispensing of the product to certain areas of a field (e.g., outside target areas) when weather conditions change. Buffer areas are used to reduce the risk of a pesticide or other chemical from contacting non-targeted pests, plants, soil, and/or water. Such buffer areas are logically represented (e.g., in software) in conventional systems as fixed polygons that define areas in, or adjacent to, a farm field that are not to receive application of one or more pesticides. Certain embodiments of dynamic spray buffer calculation systems treat the buffer areas as dynamic areas, and hence adjust the buffer areas (e.g., the polygons representing the buffer areas) for environmental conditions that may include climatic data, such as wind speed, wind direction, turbulence, temperature, and/or humidity. In some embodiments, additional adjustments may be made based on other or additional environmental conditions, such as crop height, the presence (or absence) of crop, weed/pest detection, among other sensed environmental conditions. In some embodiments, the adjustment to the application plan and involved machine controls may be based on other conditions sensed in the field, such as an approaching vehicle or other hazards. For instance, an approaching vehicle may be surrounded by a moving geofence (e.g., with its own buffer), sensed or made known through a positional system or other sensing or communication devices residing on the machine dispensing the product according to the application plan. The adjustments in buffer areas (e.g., to minimize off-target application) may result in some embodiments in adjustment of one or more machine controls, and in some embodiments, a prioritization of such machine control adjustments.

Having summarized certain features of dynamic spray buffer calculation systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, the focus is on pesticides as one example product that is applied as part of an application plan, but it should be appreciated within the context of the present disclosure that other types of product applications are contemplated to be within the scope of the present disclosure, such as those involving herbicides, fungicides, fertilizer, among others. In that regard, an example sprayer machine is used illustratively throughout the disclosure, with the understanding that other agricultural machines may be used, such as self-propelled or combination towing-towed vehicles that dispense (e.g., apply) product, such as pneumatic planters towed by tractors, among other vehicles or vehicle combinations. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example application planning process 10 in which certain embodiments of dynamic spray buffer calculation systems and methods may be employed. In the example of FIG. 1, there are three stages of application planning, including a first stage 12, a second stage 14, and a third stage 16. One having ordinary skill in the art should appreciate in the context of the present disclosure that the amount of stages in the planning process may vary, and hence the example process 10 depicted in FIG. 1 is merely for illustrative purposes, with other variations contemplated to be within the scope of the disclosure. In the first stage 12, a farmer or his agent interacts with a workstation 18 to create an application plan. The workstation 18 may reside in an office of the farmer, or at another location external to the cab of a sprayer machine. Note that the use of a workstation 18 is for illustrative purposes, and other devices may be used, such as a laptop, personal digital assistant, smartphone, tablet, among other computing devices. The application plan includes one or more maps that define field boundaries, targeted pests (e.g., target zones), sensitive areas that may include streams, water bodies, tile intakes, and other areas to be avoided. The application plan also includes as-intended product application maps and buffer layer maps. The buffer layer map is created to show areas where application of the sprayed product is prohibited to avoid drift. A spray drift model, as is known, is used to calculate the drift. Well-known software logic executing in the workstation 18 creates the product application based on the aforementioned (and other) input, the product application further including selections for nozzle type, product pressure, and ground speed and/or direction options based on the most current estimates of weather conditions, such as wind speed, wind direction, temperature, and humidity. Spatial adjustments may be made to buffer areas based on historical regional climatic trends as part of the process. In some embodiments, other tools may be utilized, such as go/no-go type tools based on the evaluated data.

Upon completion of the application plan, the farmer (or his agent) may save the application plan to a memory device 20. The memory device 20 may be configured in one of a variety of configurations, including, without limitation, a memory stick, optical disc, magnetic disc, or other transportable memory, including semiconductor memory. In some embodiments, the application plan may be communicated over a network (wired and/or wireless) from the workstation 18 to an agricultural machine, such as a sprayer machine 22, where it is loaded into memory of an on-board computer system 24 residing in the sprayer machine 22.

In the second stage 14, the application plan is revised (to become an adjusted application plan) in the sprayer machine 22 before the sprayer machine 22 commences the implementation of the application plan created by the workstation 18. In other words, the computer system 24 revises the application plan as needed based on inputted or otherwise received climate conditions and prior to the application of the product to the field. For instance, in the second stage 14, the computer system 24 may modify the spray drift model to automatically adjust the buffer areas (e.g., change the polygons, such as based on changed coordinates) with changing climatic conditions (e.g., current environmental data) as detected by weather sensors (e.g., a weather station) residing at the edge of the field or some distance away from the field. In some embodiments, a weather station residing on the sprayer machine 22 (and/or in the actual field) may communicate real-time or near real-time weather information to) the sprayer machine 22, in lieu of, or as a supplement to, the weather information from weather stations located at the edge of the field or some distance away from the field.

In some embodiments, the second stage 14 of the application planning process occurs before product is introduced into a tank (or other container) 26 of the sprayer machine 22, enabling, for instance, adjustment of the quantity of the product that is to be dispensed (applied) onto the field. For instance, changes in climatic conditions detected before the sprayer machine 22 enters the field may be communicated to the computer system 24, which in turn modifies the application map(s). The modification of the map(s) may result in an alteration of the amount of product (or change in mixture of components needed to produce the product) required, a fact which may be signaled to the operator or an automated loading apparatus to assist loading of the appropriate amount of product into the sprayer tank 26. In the second stage 14, product labels and/or application rates may also be confirmed, such as via reader logic reading smart labels on containers of the product or on the containers holding constituent components of the product.

In some embodiments, adjustments to the application plan generated in the first stage 12 are not required, and hence the sprayer machine 22 embarks on the field with the original application plan.

During the third stage 16, the sprayer machine 22 has entered the field and, in one embodiment, is about to, or has already, commenced the dispensing of the product to the targeted areas according to the original application plan (from the first stage 12) or adjusted application plan (adjusted in the second stage 14). The computer system 24 receives real-time or near real-time weather information (e.g., from on-board sensors in a weather station residing on the sprayer machine 22 or as communicated from a weather station located in the field, such as communicated from stand-alone sensors located in the field or as part of other machines in the field), including wind direction and/or wind speed. Such information may be used with the application map and a guidance system (e.g., positioning system) in the sprayer machine 22 to create a driving line/path for the actual application of the product. In some embodiments, additional information may be received (e.g., detected) by the computer system 24, such as crop height, crop density (e.g., presence or absence of crop), pest or weed detection, among other environmental conditions, that are used to adjust the application plan.

Note that the dynamic, application planning process 10 described above may be used in association with a guidance system of the sprayer machine 22 to assist in maneuvering around the buffer areas, such as tramline applications where the sprayer machine 22 drives the same path (e.g., as previously traversed, such as using waylines, as is known), row crop applications where the sprayer machine 22 drives between rows (but not limited to specific rows), and solidseeded crops where there are no constraints as to where the sprayer machine is driven. In some embodiments, geofence information may be communicated to (or otherwise sensed or detected by) the sprayer machine 22 while traversing the field, enabling real-time adjustment of the application plan and adjustment of various machine controls. For instance, other agricultural machines may be present in the field while the sprayer machine 22 is traversing the field (and possibly dispensing product onto the field), such other machines surrounded by a given geofence that is detected by the sprayer machine 22 as the other vehicle approaches the sprayer machine 22, prompting real-time adjustment of the application plan and/or machine controls to avoid dispensing drift-effected product onto the approaching machine.

As is described further below, the computer system 24 maintains a desired relationship between the spray zones and operational (fixed and/or stationary) boundaries (e.g., geofence) through cooperation with various machine controls. For instance, the sprayer machine 22 may activate a steering sub-system (e.g., alone or in combination with a positioning system) to steer a path that keeps the sprayer machine 22 (and dispensed product) in compliance with the application plan (e.g., original or adjusted). In some embodiments, the computer system 24 may use sensor information to manage a droplet size of the dispensed product to maintain an optimal level. The computer system 24 may also turn boom sections on and off, or adjust the height of the boom sections, among other changes. In other words, the computer system 24 may utilize these machine controls (e.g., all or a subset) to achieve compliance with the application plan. In particular, as the sprayer machine 22 moves through a field (or immediately before entering the field, as noted above), the computer system 24 modifies buffer areas in real-time (or near real-time, such as accounting for delays in processing) to insure that the product (e.g., pesticides) lands in targeted areas (and avoids non-targeted areas), and makes the necessary machine control adjustments to abide by the adjusted plan.

Figure 2A:
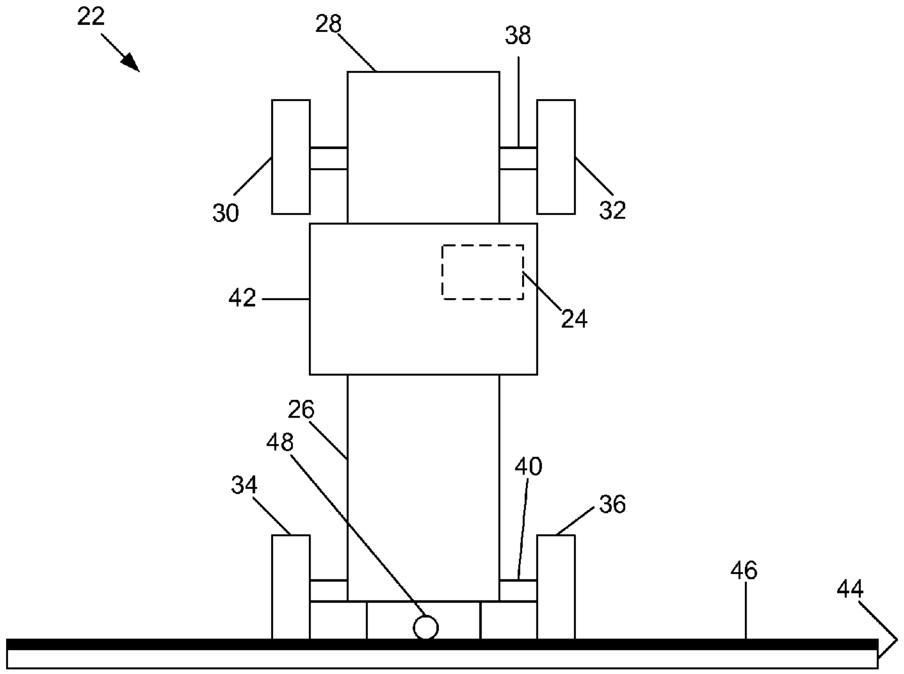
FIG. 2A is a plan view of an example sprayer machine with a coupled sprayer assembly having adjustable machine controls.
Figure 2B:
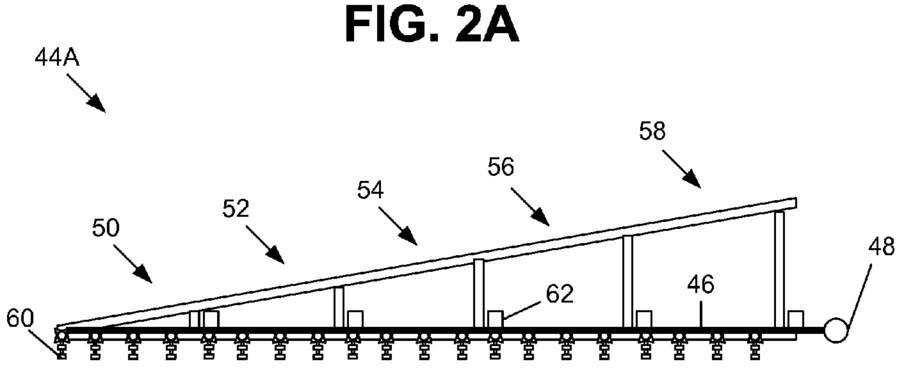
FIG. 2B is a schematic diagram of a rear end, elevation view of a portion of a sprayer machine that illustrates an example boom section of the sprayer assembly that is independently controllable by a command and control system of the sprayer machine.

Having described an example embodiment of an application planning process 10, attention is directed to FIGS. 2A-2B, which further illustrate certain components of the sprayer machine 22. One having ordinary skill in the art should appreciate in the context of the present disclosure that the example sprayer machine 22 is merely illustrative, and that other machines (e.g., agricultural machines) and/or components with like dispensing-type functionality (spraying pesticides, planting seeds, fertilizer, etc.) may be employed in some embodiments. For instance, though shown with a particular wheel and axle arrangement, the sprayer machine 22 may be comprised of independently controlled/driven wheels (e.g., via motor control, with or without an axle sharing the wheel pairs), different wheel or power arrangements, etc., as would be appreciated by one having ordinary skill in the art. Further, though shown as a self-propelled vehicle, in some embodiments, the sprayer machine 22 may be composed of a tractor-trailer arrangement where the sprayer assembly is towed behind the tractor. In the example embodiment depicted in FIG. 2A, the sprayer machine 22 comprises a front hood 28, wheels 30, 32, 34, and 36 (though tracts may be used in some embodiments), an axle assembly 38, 40 for pairs of front wheels 30, 32 and rear wheels 34, 36 respectively, a cab 42, the tank 26 which rests upon a chassis of the sprayer machine 22, and a sprayer assembly 44 coupled toward the rear of the sprayer machine 22. Located underneath the front hood 28 is an engine, as is known. The axle assemblies 38 and 40 each provide a structure upon which the wheels mount, and further include sub-assemblies that enable the raising and lowering of the chassis, a brake sub-system, as well as a steering subsystem, as is known. The cab 42 comprises an enclosure that protects the operator from environmental elements, and inside which an operator may interact with a command and control system to navigate the sprayer machine 22, as well as adjust and/or confirm settings for various machine controls. In one embodiment, the cab 42 includes the computer system 24, which is part of the command and control system, as is described further below. The tank 26 comprises a containment vessel for holding the product to be applied to the field. Though described as a tank 26, other configurations for holding product are contemplated to be within the scope of the disclosure.

The sprayer assembly 44 comprises a boom (e.g., retractable and/or foldable in some embodiments) that supports one or more conduits, such as hose(s) 46 (herein, referred to in the singular, with the understanding that additional hoses may be used to convey product or control fluid or gas as explained below), which conveys the product along the length of the sprayer assembly 44 for dispensing the same to the field. For instance, the sprayer assembly 44 may include one or more pumps, such as pump 48, coupled to the hose 46 to influence the flow of product from the tank 26 to nozzles located along the boom. Some conduits may also be used for the conveyance of control fluids (e.g., hydraulic or pneumatic fluids) and/or electricity, such as that used to actuate (e.g., actuate used herein to refer to the adjustment of settings, as well as activation of the controlled device) machine controls, including actuators used to turn on and off boom sections and/or adjust boom height, select nozzle types, adjust nozzle spray control (e.g., in electrostatic spraying implementations, such as selection of air-assist or pulsed control for an energized spray process (ESP)), control pump speeds, control spray pressure (e.g., via different nozzle, dual fluid, capstan, vari-target, etc.), among other functions. In some embodiments, drift control may be implemented via one or more of the conduits that inject drift retardant (e.g., at the effected nozzles), provide an air seal/curtain, and/or to provide in general a charged air stream (e.g., to direct an air blast to counter a wind vector), all under the control of the computer system 24.

FIG. 2B shows a more detailed, elevation view of a left rear portion of the sprayer assembly 44, denoted as sprayer assembly 44A, which in one embodiment comprises a tubular, truss-like structure with plural, independently controllable boom sections 50, 52, 54, 56, and 58, with the hose 46 conveying product (as well as additional hoses, such as for drift control or other controls) to be applied to the field as influenced by the pump 48. Each boom section, such as boom section 50, comprises one or more nozzles, such as nozzle 60 (or nozzle group). Using nozzle 60 as an illustrative example, the nozzle 60 may be configured with a rotatable actuator (mechanically or electrically actuated) which enables automated selection (e.g., by the computer system 24) of a nozzle type among a selectable group of nozzles at each nozzle location. For instance, each nozzle 60 of a given group, at a given location along the boom, may differ in nozzle performance, such as flow pattern, or be distinguished based on the type of product to flow therethrough. In some embodiments, a single nozzle may be disposed at each location (instead of a group of nozzles). In some embodiments, nozzle performance may differ according to the manner of control, such as in ESP implementations where selective control of ESP is either air-assisted or pulsed, for example. In some embodiments, each section 50-58 may have an associated actuator, such as actuator 62, which enables selective actuation (or disablement, such as via the computer system 24) of an associated boom section 50-58. In some embodiments, fewer actuators (e.g., a single actuator) may be used (coupled to the sprayer assembly 44 or otherwise) with multiple contacts to enable control of all sections 50-58. Other known mechanisms of enabling individual nozzle and/or boom section control are contemplated to be within the scope of the disclosure, and hence further explanation of the same is omitted here for brevity.

Figure 3A:
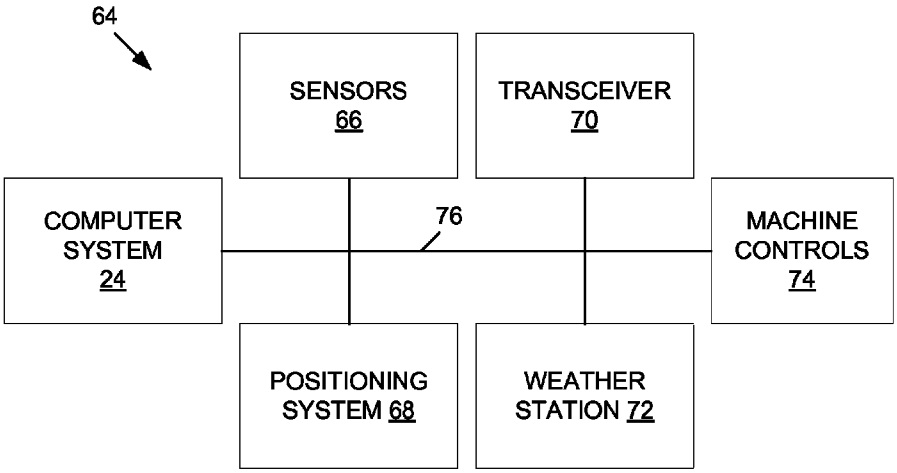
FIG. 3A is a block diagram of an example embodiment of a command and control system of a sprayer machine.

Attention is now directed to FIG. 3A, which illustrates an example embodiment of a command and control system 64. In one embodiment, a dynamic spray buffer calculation system includes all of the components of the command and control system 64. Some embodiments of a dynamic spray buffer calculation system may embody a subset of the components illustrated in FIG. 3A, or additional components in some embodiments. One having ordinary skill in the art should appreciate in the context of the present disclosure that the example command and control system 64 is merely illustrative, and that some embodiments of command and control systems may comprise fewer or additional components, and/or some of the functionality associated with the various components depicted in FIG. 3A may be combined, or further distributed among additional components, in some embodiments. In one embodiment, the command and control system 64 comprises the computer system 24, one or more sensors 66, a positioning system (e.g., global positioning system (GPS), geographic information system (GIS), etc.) 68, a transceiver 70, a weather station 72, and machine controls 74, all coupled over a network 76, such as a controller area network (CAN), though not limited to a CAN network or a single network. The sensors 66 comprise sensors associated with various machine controls, such as metering sensors (e.g., of product flow), pressure gauges, thermal sensors (e.g., to detect overheating, etc.), sensors to detect the presence/absence (and/or height) of crops, weeds, and/or sensors to detect pests, providing feedback of the current status. In some embodiments, one or more of the sensors 66 may be omitted. The positioning system 68 enables the detection of a geofence, as well the detection of vehicle positioning (e.g., of the sprayer machine 22 or other machines in the field), detection of sensitive areas (e.g., buffer areas, including moving machines proximal to the sprayer machine 22), and topographic boundaries, etc. Such information may be used to create, and adjust, the application plans associated with the application planning process 10, including the dynamic calculation (or reconfiguring) of buffer areas. In addition, the positioning system 68 cooperates with other subsystems of the sprayer machine 22, such as machine controls 74 that include navigation systems (e.g., that control vehicle speed, direction, etc.), to control the sprayer machine 22 as it traverses a field. The transceiver 70 enables the communication of information with other devices and/or networks (e.g., including mesh networks), including the workstation 18 in some embodiments, a farm (or other entity) office, other machines, etc. Communication may include telephonic as well as datagram type traffic.

The weather station 72 comprises one or more sensors (with or without associated controllers) that detect climatic conditions in the field, including real-time wind speed, wind direction, turbulence, outdoor temperature, barometric pressure, humidity, etc. In some embodiments, the weather station 72 may be omitted, and weather information may be communicated to the computer system 24 by field stations (e.g., weather stations comprising sensors located in the field) or other machines in the field.

The machine controls 74 collectively represent the various actuators and/or controlled devices residing on the sprayer machine 22, including those used to control machine navigation and sprayer functionality, including pumps, valves, meters, nozzles, boom sections, boom height controls, vehicle navigation (e.g., steering subsystems, engine/drivetrain, etc.), vehicle height controls, among others. For instance, the machine controls 74 include the pump 48, nozzle 60, and actuator 62. Note that in some embodiments, one or more of the aforementioned command and control components may be omitted, or functionality of one or more of the components may be combined. In some embodiments, the command and control system 64 may include additional components.

Figure 3B:
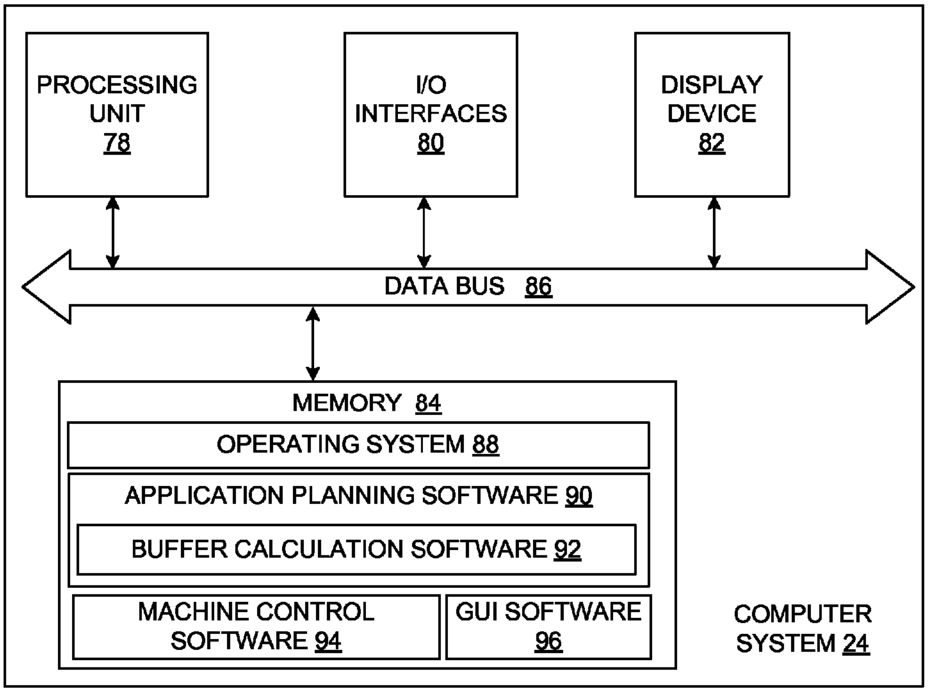
FIG. 3B is a block diagram of an example embodiment of an on-board computer system used in a command and control system for a sprayer machine.

The computer system 24 receives and processes the information from the sensors 66, positioning system 68, and/or the weather station 72 (e.g., directly, or indirectly through an intermediary device in some embodiments, such as a local controller), as well as sends signals (directly or indirectly) to the various machine controls 74 (or facilitate or manage the cooperation between the positioning system 68 and the machine controls 74), positioning system 68, and/or the transceiver 70 to effect various functionality of the sprayer machine 22. FIG. 3B further illustrates an example embodiment of the computer system 24. One having ordinary skill in the art should appreciate in the context of the present disclosure that the example computer system 24 is merely illustrative, and that some embodiments of computer systems may comprise fewer or additional components, and/or some of the functionality associated with the various components depicted in FIG. 3B may be combined, or further distributed among additional modules, in some embodiments. Certain well-known components of computer systems are omitted here to avoid obfuscating relevant features of the computer system 24. In one embodiment, the computer system 24 comprises one or more processing units 78, input/output (I/O) interface(s) 80, a display device 82, and memory 84, all coupled to one or more data busses, such as data bus 86. The memory 84 may include any one or a combination of volatile memory elements (e.g., random-access memory RAM, such as DRAM, and SRAM, etc.) and nonvolatile memory elements (e.g., ROM, hard drive, tape, CDROM, etc.). The memory 84 may store a native operating system, one or more native applications, emulation systems, or emulated applications for any of a variety of operating systems and/or emulated hardware platforms, emulated operating systems, etc. In the embodiment depicted in FIG. 3B, the memory 84 comprises an operating system 88, application planning software 90 (which in one embodiment includes buffer calculation software 92, though in some embodiments, the buffer calculation software 92 may be a module apart from the application planning software 90), machine control software 94, and graphical user interface (GUI) software 96. It should be appreciated that in some embodiments, additional or fewer software modules (e.g., combined functionality) may be employed in the memory 84 or additional memory. In some embodiments, a separate storage device may be coupled to the data bus 86, such as a persistent memory (e.g., optical, magnetic, and/or semiconductor memory and associated drives).

The application planning software 90 retrieves an application plan (e.g., as created at the workstation 18, or as modified, prior to field-entry, by the application planning software 90 and now retrieved while traversing the field and possibly dispensing product) from memory 84 (or a storage device), and receives information from one or more components of the command and control system 64, such as from the weather station 72, positioning system 68, and sensors 66. The application planning software 90 includes functionality for performing climatic modeling and drift prediction according to known technology based on at least the weather information pertaining to wind speed, wind direction, and/or turbulence received from the weather station 72. The application planning software 90 performs drift prediction and climatic modeling, and invokes the buffer calculation software 92 to adjust (e.g., in real time) the buffer areas based on the received information and calculations, and stores an adjusted or revised application plan with adjusted buffer areas in the memory 84. The application planning software 90 cooperates with the machine control software 94 to cause the sprayer machine 22 to dispense the product according to the real-time adjusted application plan. In some embodiments, modification of the application plan may be implemented, at least in part, in cooperation with operator input. For instance, the application planning software 90 (and/or machine control software 94) may invoke the GUI software 96 to provide for display on a screen of the display device 82 a GUI that enables user entry of information, including selection of machine control settings, confirmation of setting adjustments, among other information.

In one embodiment, the sprayer machine 22 may operate according to the adjusted plan by, in cooperation with the positioning system 68, altering the direction and/or speed of the sprayer machine via the machine control software 94 actuating one or more devices of the machine controls 74. In some embodiments, the sprayer machine 22 may operate according to the adjusted plan by, in cooperation with the machine control software 94 and machine controls 74, selecting a different nozzle type 60 (e.g., which may change the nozzle size) or nozzle dispensing control method, adjusting pressure at the pump 48 (or other pumps), adjusting the actuators 62 to turn on or off one or more boom sections 50-58 (which may also controls which nozzle 60 is outputting product), and/or implementing drift control products (e.g., release of product that changes the viscosity of the spray solution, which may result in larger droplets and/or fewer fine droplets). Note that the effected controls in any given circumstance may include one or any combination of the above mentioned controls or other controls. Further, in some embodiments, a subset of the controls may be utilized in a manner that is prioritized. For instance, a change suitable to comply with the adjusted plan (e.g., within a given tolerance) may be implemented based on a prioritized scheme that utilizes the most effective drift control scheme with the least amount of controlled devices being actuated.

Execution of the software modules 90-96 are implemented by the processing unit 78 under the auspices of the operating system 88. In some embodiments, the operating system 88 may be omitted and a more rudimentary manner of control implemented. The processing unit 78 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computer system 24.

The I/O interfaces 80 provide one or more interfaces to the network 76, as well as interfaces for access to computer readable mediums, such as memory drives (e.g., for insertion of the memory device 20), which includes an optical, magnetic, or semiconductor-based drive. In other words, the I/O interfaces 80 may comprise any number of interfaces for the input and output of signals (e.g., analog or digital data) for conveyance over the network 76 and other networks. For instance, the output comprises output signals (e.g., actuation signals, signals pertaining to the adjustment of settings, actuation of a given controlled device, etc.) for reception by one or more of the components of the command and control system 64, such as the machine controls 74. The input may comprise input by an operator through a keyboard or mouse or other input device (or audible input in some embodiments), and input from signals carrying information from one or more of the components of the command and control system 64, such as from sensors 66, the weather station 72, etc. Other devices, such as audible alarms, warning lights, etc. may be controlled through the I/O interfaces 80.

The display device 82 comprises one of a variety of types of displays, including liquid crystal diode (LCD), plasma, among others, that provide an outputted GUI to the operator as indicated above. Note that in some embodiments, the display device 82 may be a headset-type display.

The transceiver 70 includes functionality to enable wired or wireless communication, such as locally or via a network to a remote location. As a non-limiting example, the transceiver 70 may include a modulator/demodulator (e.g., a modem), wireless (e.g., radio frequency (RF)) transceiver, a telephonic interface, among other network components.

When certain embodiments of the computer system 24 are implemented at least in part in logic configured as software/firmware, as depicted in FIG. 3B, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computer system 24 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
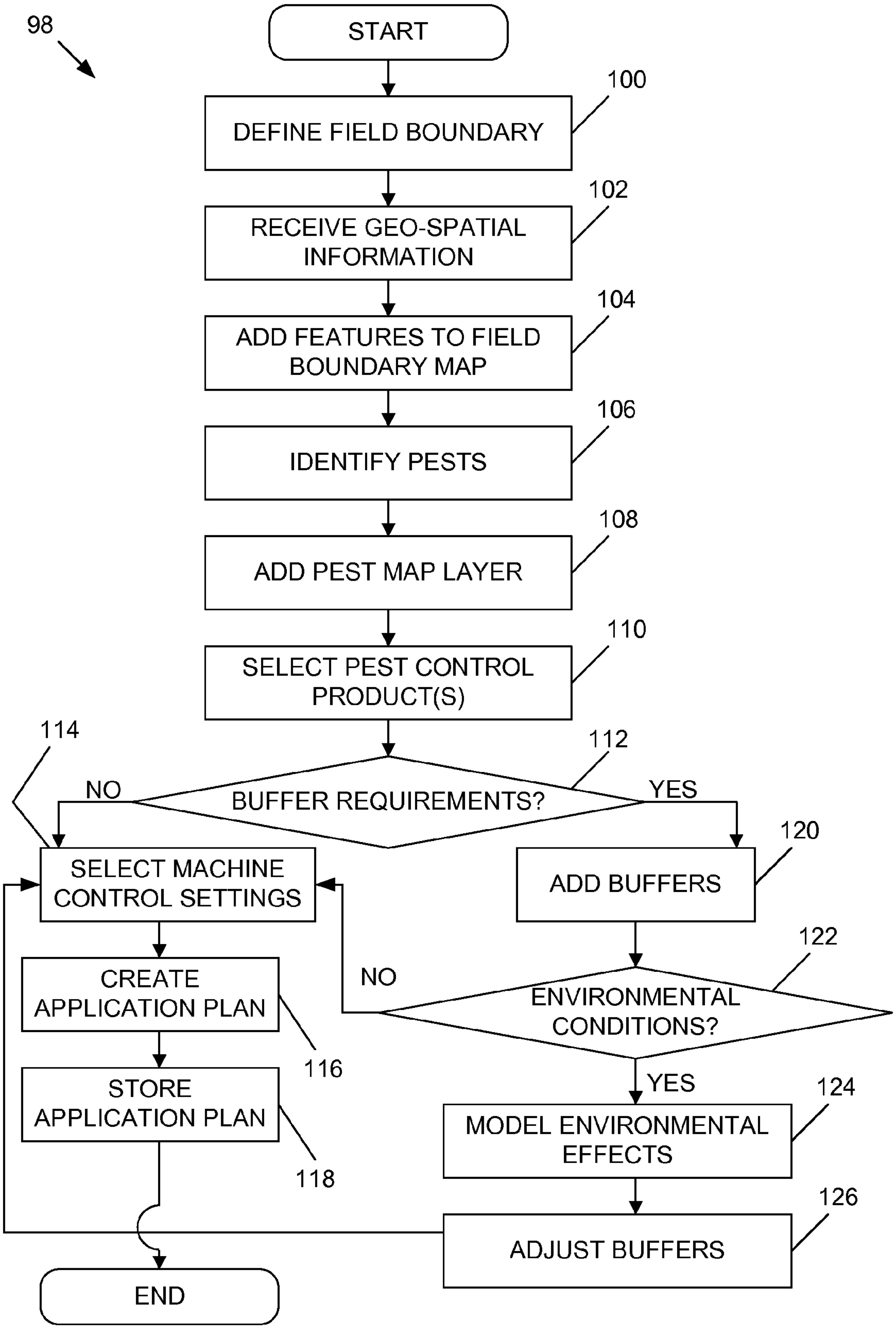
FIG. 4 is flow diagram that illustrates an example embodiment of a method for establishing an application plan in a pre-planning stage, the application plan comprising initial coordinates for one or more buffer areas.

Having described certain embodiments of example dynamic spray buffer calculation systems and methods, attention is directed to the flow diagram shown in FIG. 4, which is an example method 98 for implementing a first stage application planning process, such as the first stage planning 12 shown in FIG. 1. One having ordinary skill in the art should appreciate in the context of the present disclosure that the example first stage application planning 98 is merely illustrative, and that fewer or additional steps in the process may be implemented in some embodiments. In some embodiments, the method 98 may be implemented by the computer system 24. It is assumed for purposes of illustration that the workstation 18 generates a GUI that guides a user (e.g., farmer, agent of a farmer, etc.) through one or more of steps depicted in FIG. 4, and the workstation application planning software of the workstation 18 may fill GUI-presented data fields based on user selection of one of a plurality of predetermined options. The workstation application planning software is implemented on a processing unit similar to that described in association with FIG. 3B to perform predictive buffer calculations based on weather/climate (e.g., environmental) information. In this process, climate modeling software, drift prediction software, and/or buffer creation tools may be employed as an integral part of, or in association with, the workstation application planning software. In addition, GIS and/or GPS tools may also be employed in cooperation with the workstation application planning software. The workstation application planning software also cooperates with GUI application software to generate each query in the application planning process to invoke user input, and ultimately, derive a pre-field application plan (pre-application plan) that can be stored on a disc or other memory device as explained earlier, or communicated via a wireless communication with the sprayer machine 22. Note that in some embodiments, in some of the steps depicted in FIG. 4, information may be received, at least in part, without user intervention.

The workstation application planning software is used to receive or define geo-spatial data beginning with a field boundary (100), In (102), the geo-spatial information may include one or more layers such as soil type, area coordinates for streams, waterways, tile intakes, other sources of water, or other environmentally-sensitive areas. Such information may be provided on the display automatically based on historical data, or based on global position functionality (e.g., GPS, GIS, etc.) associated with the field to be treated with the product.

The workstation application planning software adds features to a field boundary map (104). Pests, such as weeds, insects and/or diseases, are identified (106), and added as one or more pest map layers (108). The workstation application planning software selects one or more pest control products (110), and then determines whether there are buffer requirements or not (112). If no buffer requirements are present ("no"), the workstation application planning software selects machine control settings (114). Such settings may include selection of an appropriate sprayer nozzle, product (e.g., fluid) pressure, machine speed, boom height, etc. The workstation application planning software then coalesces the above information and creates an application plan (116), and stores the same (e.g., in memory) (118).

From (112), if buffer requirements exist ("yes"), the workstation application planning software adds buffer areas (120), and determines whether environmental (e.g., long term) conditions exist (122). If not, the workstation application planning software proceeds to (114), otherwise, the workstation application planning software models environmental effects (124), adjust buffer areas accordingly (126), and proceeds to selecting machine settings (114) and so on.

Figure 5:
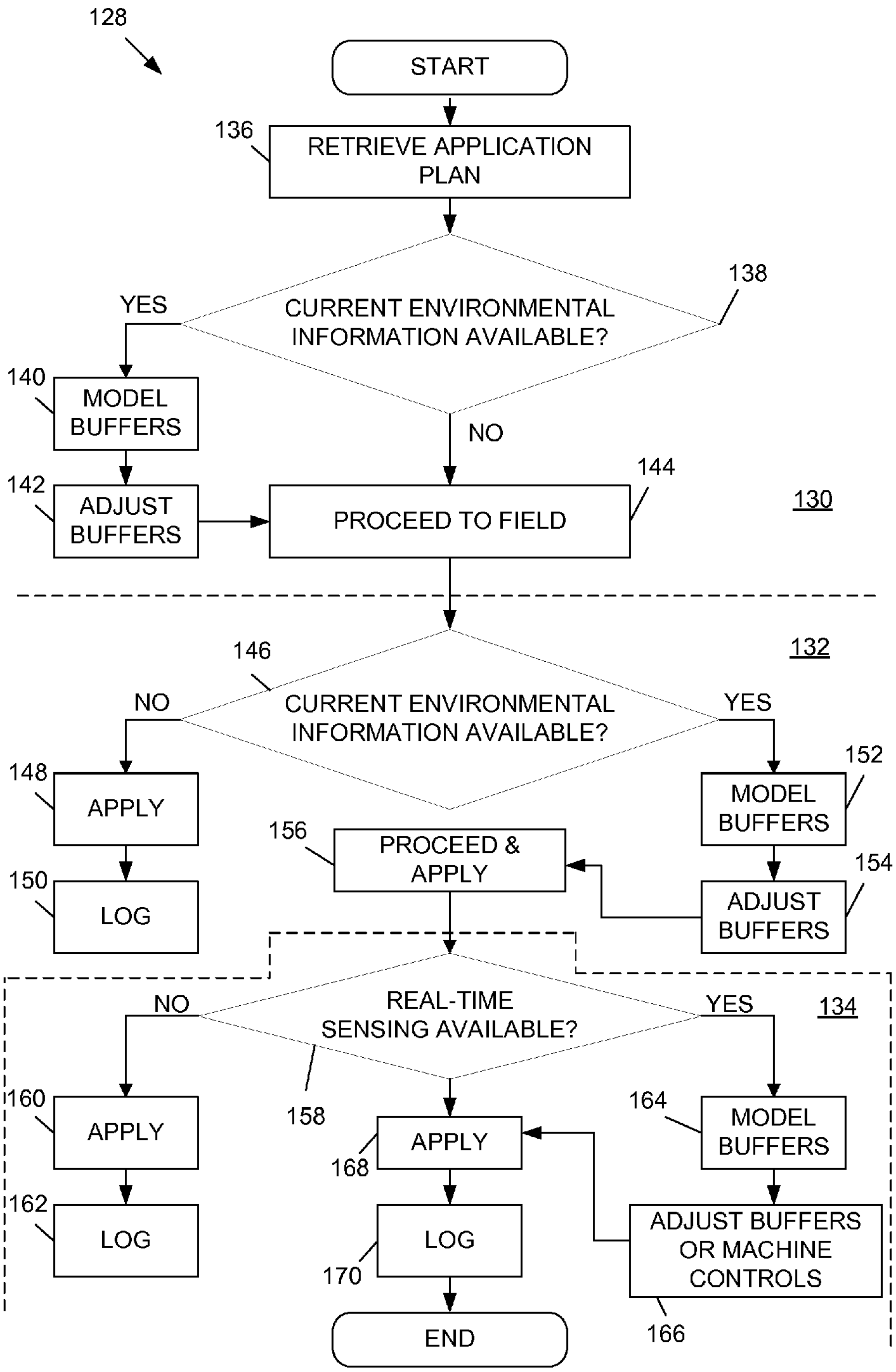
FIG. 5 is a flow diagram that illustrates an example embodiment of a method for establishing an adjusted application plan in plural day-of-field planning stages, the adjustment due to changes in climatic conditions.

Referring now to FIG. 5, shown is a flow diagram of an example embodiment of a method 128 that the application planning software 90 executes, at least in part, in cooperation with the processing unit 78 among other components of the command and control system 64. One having ordinary skill in the art should appreciate in the context of the present disclosure that the example method 128 is merely illustrative, and that fewer or additional steps in the process may be implemented in some embodiments. The method 128 is shown in three stages, including a first stage 130, second stage 132 and a third stage 134, though in some embodiments, fewer or more stages may be implemented. The first stage 130 corresponds to pre-entry to the field. The second stage 132 corresponds to entrance onto the field prior to dispensing the product to the field. The third stage 134 corresponds to real-time sensing of climatic conditions while dispensing product onto the field. Each stage is separated by a dashed line in this example. The first stage 130 (e.g., pre-dispensing of product, such as prior to entering the field) corresponds to the second stage 14 shown in FIG. 1, and the second 132 and third stages 134 (e.g., entry onto the field, prior to and subsequent to, respectively, commencement of the dispensing of product to the field) correspond to the third stage 16 shown in FIG. 1. In the first stage 130, the application planning software 90 retrieves the application plan (136). For instance, the application planning software 90 retrieves the application plan from memory 84, the application plan generated in one embodiment in accordance with the method 98 depicted in FIG. 4. The application planning software 90 may retrieve the application plan automatically, such as based on the positioning system 68 signaling to the computer system 24 that the sprayer machine 22 is in proximity to the entrance of the field where the product is intended to be dispensed (i.e., applied). In some embodiments, the application plan may be retrieved responsive to the operator accessing the application plan from memory 84 (e.g., via interaction with a GUI), or in some embodiments, responsive to the operator inserting the memory device 20 into a drive of the computer system 24, such as an optical, magnetic, or semiconductor-based drive.

The application planning software 90 determines whether there is any current environmental information available (138), such as information signaled by a weather station at the edge of the field or some distance away. If so ("yes"), the application planning software 90 invokes the buffer calculation software 92 (among one or more other software functionality, such as drift prediction software, climatic modeling software, etc.) to model buffer areas (140), adjust the buffer areas (142), and then causes the sprayer machine 22 (e.g., via cooperation with the machine control software 94, machine controls 74, and/or positioning system 68) to proceed to the field (144). In some embodiments, a GUI may be presented indicating to the operator that the application plan has been adjusted and machine control is now to occur in accordance with the adjusted plan, and prompts the operator to pilot the sprayer machine 22 forward to the field (or to enable guided navigation). In some embodiments, the GUI may merely prompt the operator to pilot the sprayer machine 22 forward (or prompt the operator to engage guided navigation), providing a lack of transparency to the operator about the underlying application planning adjustment.

If the application planning software 90 determines that there is no current environmental information available ("no"), the sprayer machine 22 advances to the field in similar manner (144), and commences (in the second stage 132) another query before dispensing the product. The application planning software 90 determines (e.g., continues to monitor) whether there is any current environmental information available (146), such as via the field edge weather station(s) or others. If not ("no"), the sprayer machine 22 commences application of the product to the field (148), the application of the product logged and stored in memory 84 or another data recording device (150). If current environmental information is available ("yes"), the application planning software 90 models the buffer areas (e.g., invoking the buffer calculation software 92 in association with implementing one or more of climatic modeling software, drift prediction, etc.) (152), adjusts the buffer areas (e.g., the coordinates of the buffer areas) to derive an adjusted application plan (154), and proceeds to traverse the field and apply the product based on the adjustments (156).

In the third stage 134, while traversing the field and applying the product, the application planning software 90 determines whether there is any real-time sensing available (158). If not ("no"), the sprayer machine 22 continues to apply the product (160) and logs the as-applied data (162). If real-time sensing is available ("yes"), the application planning software 90 models the buffers (164) as explained above and adjusts the buffers or machine controls based on the real-time climatic data (166). The real-time sensing may be accomplished through receipt of an on-board weather station 72 detecting the environmental conditions and communicating the data to the application planning software 90, or in some embodiments, by receiving real-time (or near real-time) data from in-field weather stations (e.g., on the field or in proximally located machines). In some embodiments, a combination of information from both in-field locations and the on-board weather station 72 may be utilized. The sprayer machine 22 continues to apply the product based on the adjusted settings and/or buffers (168), and logs the as-applied data (170). It should be appreciated that one or more of the steps described above and depicted in FIG. 5 may be omitted in some embodiments, and/or the steps may be re-arranged in some embodiments. In some embodiments, fewer stages may be employed.

Note that in some embodiments, once the sprayer machine 22 passes the sensitive areas, the sprayer machine controls may be re-configured for optimum efficiency and efficacy (e.g., according to the adjusted application plan).

Figure 6:
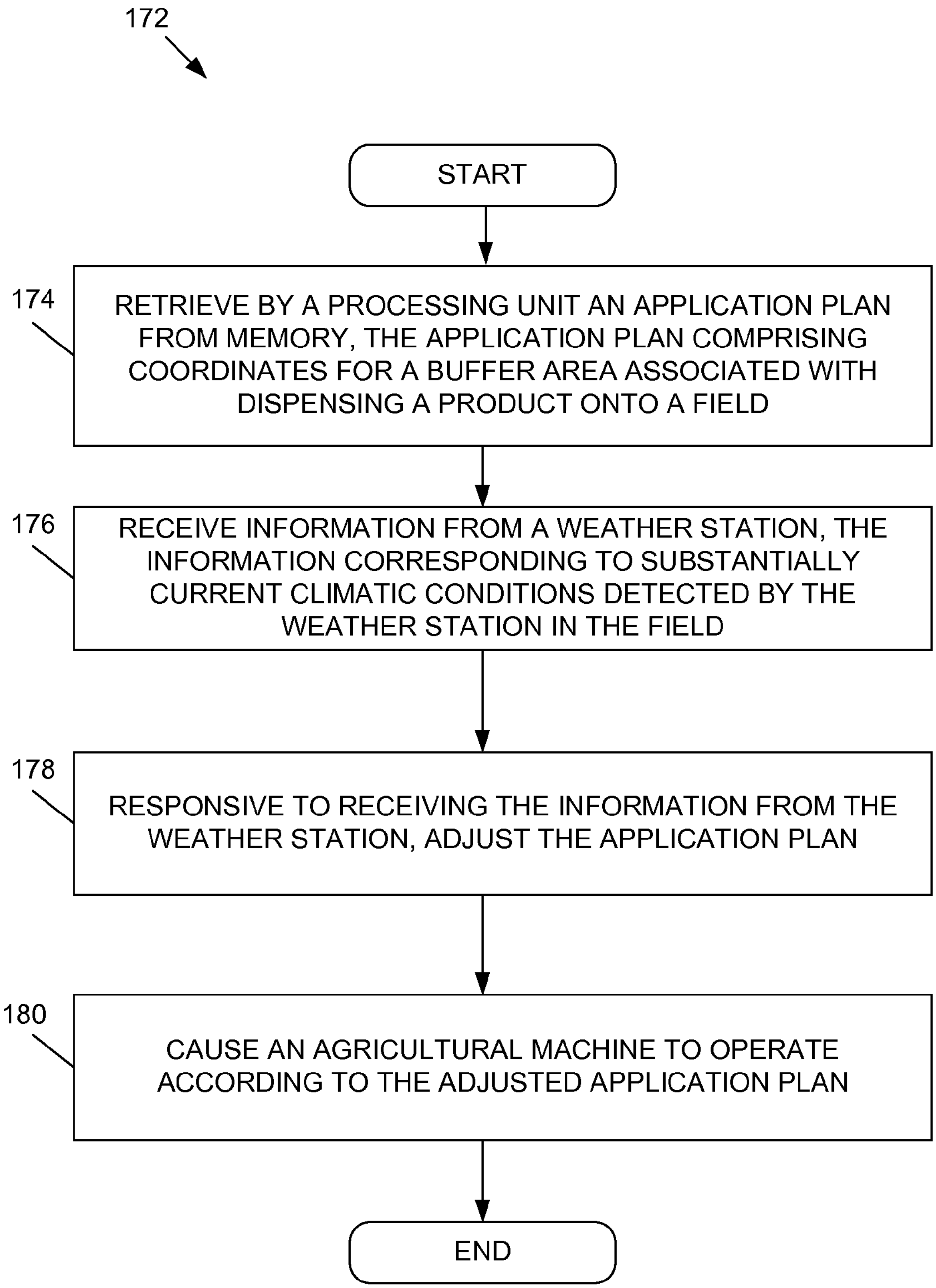
FIG. 6 is a flow diagram that illustrates an example embodiment of a method for adjusting an application plan proximal to, or on, a field where product is to be applied (or is being applied) based on changes in climatic conditions.

In view of the above description, it should be appreciated that one embodiment of a method, as depicted in FIG. 6 and denoted as method 172, comprises: retrieving (e.g., by a processing unit, such as processing unit 78) an application plan from memory, the application plan comprising coordinates for a buffer area associated with dispensing a product onto a field (174); receiving information from a weather station, the information corresponding to substantially current climatic conditions detected by the weather station in the field (176); responsive to receiving the information from the weather station, adjusting the application plan (178); and causing an agricultural machine to operate according to the adjusted application plan (180).

It should be appreciated that adjustment to the application plan (e.g., the buffer areas) may not be immediately followed by machine control adjustment, such as where the distance between the sprayer machine 22 and a given sensitive area at the time of the calculations (e.g., for the buffer area adjustments) does not necessitate an immediate adjustment to the machine controls. In some embodiments, the application planning software 90 may embark on a re-evaluation of the currently employed application plan upon a triggering distance from a sensitive area, the triggering distance allowing a suitable time for the application planning software 90 to make adjustments to the buffer areas based on real-time sensed environmental conditions and for the machine controls to be modified in time to achieve the adjusted application plan for the approaching sensitive area. In such instances, machine control adjustment may (though not necessarily) immediately follow the buffer area adjustment. In some embodiments, the triggering distance for re-evaluation may be replaced with an anticipated time (a triggering time) of reaching the sensitive area.

In some embodiments, real-time weather information may be omitted, and buffer area adjustment may be implemented according to an adjusted application plan in response to an oncoming geofence (e.g., an oncoming vehicle surrounded by a geofence).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method, comprising:

retrieving by a processing unit an application plan from memory, the application plan comprising coordinates for a buffer area associated with dispensing a product onto a field while avoiding the buffer area;

receiving information from a weather station, the information corresponding to substantially current climatic conditions detected by the weather station in the field;

responsive to receiving the information from the weather station and subsequent to commencement of the dispensing of the product onto the field according to the application plan, adjusting the application plan by changing the coordinates to thereby reconfigure the buffer area; and causing an agricultural machine to operate according to the adjusted application plan, including steering the machine to follow an adjusted path that is in compliance with the adjusted application plan, the adjusted path avoiding the reconfigured buffer area.

2. The method of claim 1, wherein the retrieving, receiving, adjusting, and causing occur prior to the commencement of the dispensing of the product onto the field according to the application plan.

3. The method of claim 1, wherein the retrieving, receiving, adjusting, and causing occur subsequent to the commencement of the dispensing of the product onto the field according to the application plan.

4. The method of claim 1, further comprising providing a graphical user interface in association with one or more of the retrieving, receiving, adjusting, and causing.

5. The method of claim 1, further comprising receiving the application plan into the memory via a wireless communication signal or upload via a memory device.

6. The method of claim 1, wherein receiving the information from the weather station comprises receiving one or any combination of wind speed, wind direction, wind turbulence, temperature, or humidity from one or more sensors residing on the agricultural machine or in the field.

7. The method of claim 1, wherein causing an agricultural machine to operate according to the adjusted application plan further comprises causing at least one boom section to dispense the product while simultaneously causing at least one other boom section to not dispense the product.

8. The method of claim 1, further comprising storing in memory the adjusted application plan.

9. The method of claim 1, wherein causing the agricultural machine to operate according to the adjusted application plan comprises adjusting settings corresponding to one or any combination of nozzle size, nozzle type, pressure of the product, machine ground speed, machine direction, on or off controls of boom sections, on or off controls of nozzles, boom height controls, or agricultural machine controls.

10. The method of claim 1, wherein causing the agricultural machine to operate according to the adjusted application plan comprises implementing drift control products.

11. A system, comprising:
a memory comprising logic; and
a processing unit configured by the logic to:
retrieve an application plan from memory, the application plan comprising coordinates for a buffer area associated with a field and a dispensing plan implemented by an agricultural machine for dispensing a product onto the field while avoiding the buffer area;
receive information from a weather station, the information corresponding to substantially current climatic conditions detected in the field;
responsive to receiving the information from the weather station and subsequent to commencement of the dispensing of the product onto the field according to the application plan, adjust the application plan by changing the coordinates to thereby reconfigure the buffer area; and
actuate machine controls of the agricultural machine to operate according to the adjusted application plan, including steering the machine to follow an adjusted path that is in compliance with the adjusted application plan, the adjusted path avoiding the reconfigured buffer area.

12. The system of claim 11, wherein the processing unit is further configured by the logic to retrieve, receive, adjust, and actuate prior to the commencement of the dispensing of the product onto the field according to the application plan.

13. The system of claim 11, wherein the processing unit is further configured by the logic to retrieve, receive, adjust, and actuate in real time while traversing the field, dispensing product onto the field, or a combination of both.

14. The system of claim 11, wherein the processing unit is further configured by the logic to receive the application plan into the memory via a wireless communication signal or upload via a memory device.

15. The system of claim 11, further comprising the weather station communicatively coupled to the processing unit, wherein the weather station comprises sensors configured to receive one or any combination of wind speed, wind direction, wind turbulence, temperature, or humidity as detected in the field.

16. The system of claim 11, wherein the logic comprises buffer calculation logic, wherein the processing unit is further configured by the logic to adjust the application plan by adjusting coordinates of the buffer area or a plurality of buffer areas, the plurality of buffer areas including at least the buffer area.

17. The system of claim 11, wherein the processing unit is further configured by the logic to adjust and actuate based on detection of a moving geofence.

18. The system of claim 11, further comprising machine controls coupled to the processing unit, wherein the processing unit is further configured by the logic to actuate by adjusting settings of one or any combination of nozzle size, nozzle type, pressure of the product, machine ground speed, machine direction, on or off controls of boom sections, on or off controls of nozzles, boom height controls, or agricultural machine controls.

19. The system of claim 11, further comprising a positioning system coupled to the processing unit, wherein the processing unit is further configured by the logic to actuate machine controls corresponding to automatically steer the agricultural machine, adjust the speed of the agricultural machine, or a combination of both in accordance with the adjusted application plan.

20. A command and control system for a sprayer machine, the command and control system comprising:
a weather station residing on the sprayer machine, the weather station comprising one or more sensors that detect climatic conditions in a field;
machine controls, the machine controls including controls that affect the dispensing of product from a sprayer assembly of the sprayer machine;
a positioning system, the positioning system configured to automatically navigate the sprayer machine through the field; and
a computer system, the computer system comprising a processing unit and memory encoded with logic, the processing unit configured to execute the logic to:
retrieve an application plan from memory, the application plan comprising coordinates for a buffer area associated with the field and a dispensing plan implemented by a sprayer machine for dispensing a product onto the field;
receive information from the weather station, the information corresponding to substantially current climatic conditions detected in the field;
responsive to receive the information from the weather station, adjust the coordinates of the buffer area in the application plan;
communicating the adjusted coordinates to the positioning system to adjust the navigation of the sprayer machine in response to the adjusted coordinates, wherein adjusting the navigation of the sprayer machine includes steering the machine to follow an adjusted path that avoids the buffer area defined by the coordinates; and
adjust the controls of the sprayer assembly based on adjusted coordinates of the buffer area.

* * * * *